(12) United States Patent
Mayor et al.

(10) Patent No.: US 10,886,819 B2
(45) Date of Patent: Jan. 5, 2021

(54) ELECTRIC MACHINE WITH DIRECT WINDING HEAT EXCHANGER

(71) Applicants: J. Rhett Mayor, Braselton, GA (US); S. Andrew Semidey, Woodstock, GA (US)

(72) Inventors: J. Rhett Mayor, Braselton, GA (US); S. Andrew Semidey, Woodstock, GA (US)

(*) Notice: Subject to any disclaimer, the term of this patent is extended or adjusted under 35 U.S.C. 154(b) by 288 days.

(21) Appl. No.: 15/919,332

(22) Filed: Mar. 13, 2018

(65) Prior Publication Data

US 2018/0205291 A1 Jul. 19, 2018

Related U.S. Application Data

(63) Continuation-in-part of application No. 15/071,571, filed on Mar. 16, 2016, now Pat. No. 9,954,420, which is a continuation-in-part of application No. 13/623,023, filed on Sep. 19, 2012, now Pat. No. 9,331,553.

(60) Provisional application No. 61/536,326, filed on Sep. 19, 2011.

(51) Int. Cl.
| | |
|---|---|
| *H02K 9/00* | (2006.01) |
| *H02K 3/12* | (2006.01) |
| *H02K 15/02* | (2006.01) |
| *H02K 3/28* | (2006.01) |

(52) U.S. Cl.
CPC ............. *H02K 9/005* (2013.01); *H02K 3/12* (2013.01); *H02K 3/28* (2013.01); *H02K 15/024* (2013.01)

(58) Field of Classification Search
CPC .......... H02K 15/024; H02K 3/12; H02K 3/28; H02K 9/005
USPC .......................................................... 310/54
See application file for complete search history.

(56) References Cited

U.S. PATENT DOCUMENTS

| | | | | |
|---|---|---|---|---|
| 3,226,581 A | * | 12/1965 | Brewster | .............. H02K 11/046 |
| | | | | 310/59 |
| 4,213,745 A | | 7/1980 | Roberts | |
| 5,081,382 A | * | 1/1992 | Collings | .................. H02K 3/50 |
| | | | | 310/260 |
| 5,513,194 A | | 4/1996 | Tamura | |
| 5,777,408 A | * | 7/1998 | Brem | ..................... H02K 9/005 |
| | | | | 310/71 |

(Continued)

*Primary Examiner* — Alex W Mok

(57) ABSTRACT

According to various aspects disclosed herein, exemplary embodiments of an electric machine with direct winding heat exchange is disclosed, including a stator, a rotor, at least one coil positioned on a stator tooth of the stator, with the coil comprising one or more turns of a conductor and an insulator, where the insulator and coil form a monolithic body having at least one facet at an angle that corresponds to the geometry of a stator slot of the stator. In addition the exemplary electric machine can include at least one heat exchanger thermally coupled to the at least one coil, at least one non-conducting bulkhead, the non-conducting bulkhead comprising a body made of a polymer, the body including a first sealing surface and a tapered channel, the channel including a second sealing surface, where the first sealing surface is configured to provide electric and fluid isolation for a plate of the electric machine, the second sealing surface of the channel is configured to receive a distal end of the at least one heat exchanger and provide electric and fluid isolation for the heat exchanger.

4 Claims, 17 Drawing Sheets

(56) References Cited

U.S. PATENT DOCUMENTS

| | | | |
|---|---|---|---|
| 6,288,460 B1 * | 9/2001 | Fakult | H02K 3/24 |
| | | | 310/179 |
| 6,486,586 B2 | 11/2002 | Higashino et al. | |
| 6,621,185 B2 | 9/2003 | Riess | |
| 8,686,605 B2 | 4/2014 | Takahashi et al. | |
| 2003/0064428 A1 | 4/2003 | Herman | |
| 2005/0012409 A1 | 1/2005 | Philippart | |
| 2005/0057106 A1 * | 3/2005 | Allen | H02K 9/22 |
| | | | 310/54 |
| 2005/0151429 A1 | 7/2005 | Taketsuna et al. | |
| 2005/0191186 A1 | 9/2005 | Harris | |
| 2006/0232143 A1 * | 10/2006 | Purvines | H02K 3/522 |
| | | | 310/43 |
| 2008/0143199 A1 | 6/2008 | Laskaris et al. | |
| 2009/0324435 A1 * | 12/2009 | Sears | H02K 3/522 |
| | | | 417/423.7 |
| 2010/0045125 A1 | 2/2010 | Takenaka et al. | |
| 2010/0102649 A1 | 4/2010 | Cherney et al. | |
| 2010/0102650 A1 | 4/2010 | Eriksen et al. | |
| 2010/0102651 A1 | 4/2010 | Mohle et al. | |
| 2010/0102652 A1 | 4/2010 | Booth et al. | |
| 2010/0176668 A1 | 7/2010 | Murakami et al. | |
| 2010/0264760 A1 | 10/2010 | Matsui et al. | |
| 2011/0133580 A1 | 6/2011 | Sugimoto et al. | |
| 2011/0156509 A1 | 6/2011 | Minemura et al. | |
| 2011/0221287 A1 | 9/2011 | Lucchi | |

* cited by examiner

ELECTRIC MACHINE WITH DIRECT WINDING HEAT EXCHANGER

RELATED APPLICATION DATA

This application is a continuation-in-part application, which claims priority to U.S. patent application Ser. No. 15/071,571, filed on Mar. 16, 2016, which claims benefit of U.S. patent application Ser. No. 13/623,023, filed Sep. 19, 2012, which claims priority to U.S. Provisional Patent Application No. 61/536,326, filed on Sep. 19, 2011, all of these applications are incorporated by reference herein as if fully set forth below in their entireties.

BACKGROUND

The increasing demand for electrical power sources for, for example, hybrid electric vehicle (HEV) and electric vehicle (EV) power trains has created a need for high torque density electric machines. In addition to HEV and EV passenger cars, other applications that require high torque density machines include, for example and without limitation, off road construction equipment, freight trucks, military ships, elevators, and electric actuators for flight control surfaces in aircrafts. Currently, a limiting factor for consistent power output is the thermal degradation of the windings. In other words, the heat in the windings caused by generating higher power outputs increases the resistance in the windings, and degrades and melts insulation, among other things.

Electrical power sources utilizing an improved cooling system are therefore needed. Also needed are improved manufacturing techniques to make electrical power sources utilizing improved cooling systems.

SUMMARY

According to various aspects disclosed herein, exemplary embodiments of an electric machine with direct winding heat exchange is disclosed, including a stator, a rotor, at least one coil positioned on a stator tooth of the stator, with the coil comprising one or more turns of a conductor and an insulator, where the insulator and coil form a monolithic body having at least one facet at an angle that corresponds to the geometry of a stator slot of the stator. In addition the exemplary electric machine can include at least one heat exchanger thermally coupled to the at least one coil, at least one non-conducting bulkhead, the non-conducting bulkhead comprising a body made of a polymer, the body including a first sealing surface and a tapered channel, the channel including a second sealing surface, where the first sealing surface is configured to provide electric and fluid isolation for a plate of the electric machine, the second sealing surface of the channel is configured to receive a distal end of the at least one heat exchanger and provide electric and fluid isolation for the heat exchanger.

According to various aspects disclosed herein, exemplary embodiments of a consolidated coil for use in an electric machine using directing winding heat exchange is disclosed, the consolidated coil including a coil comprising one or more turns of a conductor, and an insulator, where the insulator and coil form a monolithic body having at least one facet at an angle that corresponds to the geometry of a stator slot of a stator.

According to various aspects disclosed herein, exemplary embodiments of a non-conductive bulkhead for use in an electric machine using direct winding heat exchange is disclosed, the non-conductive bulkhead including a body made of a polymer, the body including a first sealing surface and a tapered channel, the channel including a second sealing surface, where the first sealing surface is configured to provide electric and fluid isolation for a plate of an electric machine, and where the second sealing surface of the channel is configured to receive and provide electric and fluid isolation for a direct winding heat exchanger.

DETAILED DESCRIPTION

Figure 1:
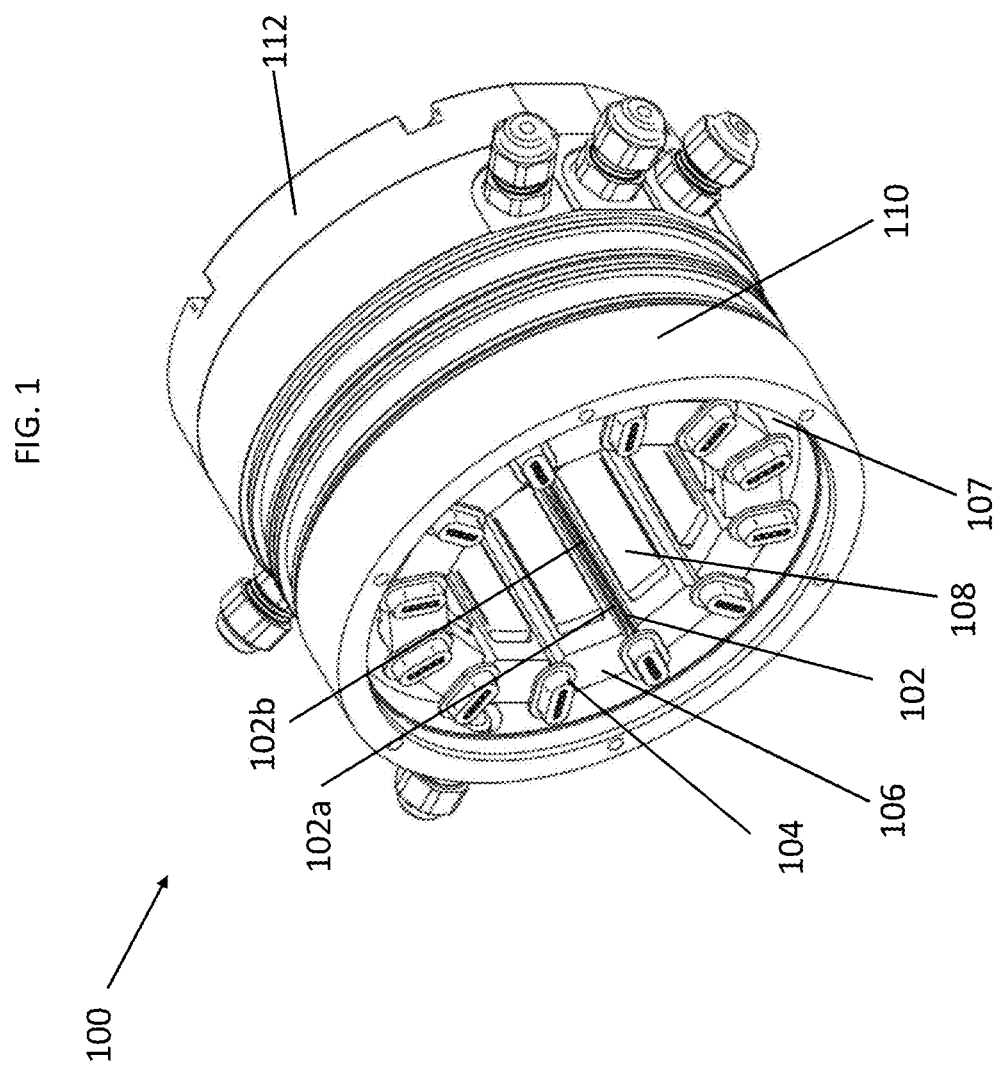
FIG. 1 is a perspective view of an electric machine illustrating an embodiment of the disclosure.

FIG. 1 is a perspective view showing elements of an electric machine 100 to illustrate an embodiment of this disclosure. The electric machine 100 includes a casing 110, in which is positioned a stator 107 having a plurality of stator teeth, one of which is identified by reference 108. Positioned around each stator tooth 108 is a coil 106. The machine 100 also includes a plurality of heat exchangers, one of which is identified by reference 102. The heat exchanger 102 can include micro features shown by reference 102a disposed in an interior channel 102b of the heat exchanger 102. In other embodiments, the heat exchanger 102 optionally does not include micro features or an interior channel without departing from the scope of this disclosure.

The stator teeth, heat exchangers, and coils are referred to individually and collectively herein by references 108, 102 and 106, respectively. The machine 100 also includes an end cap 112, that can be used to create a plenum, with the plenum being in fluid communication with one or more heat exchangers 102. While the machine 100 typically will include an end cap on both ends, only end cap 112 is shown so that the reader can observe the interior of the machine 100.

In the embodiment of FIG. 1, there are twelve coils 106, with one of the heat exchanger 102 positioned in between each pair of coils 106. The coils 106 can be formed by winding wire around a stator tooth, or as described in more detail below, the windings may be consolidated coils. Other methods for creating stator windings known to a person of ordinary skill and can be employed in creating the stator windings of electric machine 100. Each heat exchanger 102 includes two distal ends around which a non-conducting bulkhead can be positioned. One such bulkhead is identified by reference 104 and there are twelve shown in FIG. 1. The bulkheads are referred to individually and collectively herein by reference 104. Due to the end cap 112, only one of the distal ends of the heat exchangers 102 can be seen in FIG. 1. It should be understood that a non-conducting bulkhead can be positioned on each of the distal ends of the heat exchangers 102. While the embodiment in FIG. 1 illustrates 12 heat exchangers and 12 bulkheads, it is understood to a person of ordinary skill, that other combinations of heat exchangers and bulkheads, from one to a plurality may be used without departing from the scope of this disclosure. In addition, electric machines with more or less than 12 stator teeth can apply the teachings in this disclosure.

Figure 2:
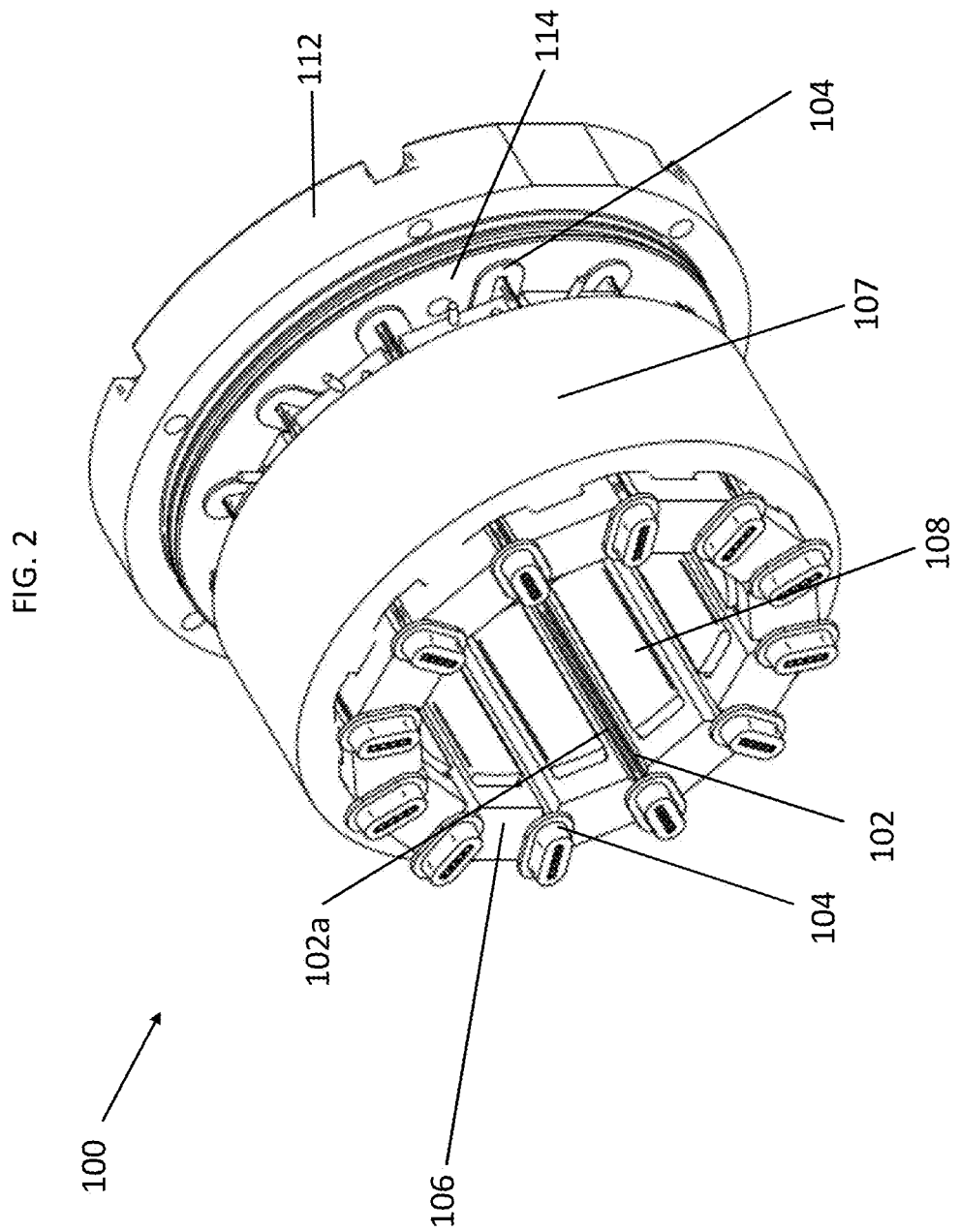
FIG. 2 is a perspective view of elements of an electric machine illustrating an embodiment of the disclosure.

FIG. 2 shows another perspective view of electric machine 100 with the casing 110 removed to illustrate aspects of this disclosure. FIG. 2 illustrates the stator 107 with stator teeth 108, the coils 106, and the heat exchangers 102 having micro features 102a. Bulkheads 104 are shown and in this embodiment, each heat exchanger 102 includes a bulkhead 104 on each distal end of the heat exchanger 102. Further illustrated in FIG. 2 is a plate 114. The plate 114 includes a plurality of openings each of which correspond to a location where a bulkhead 104 can be positioned. The plate 114 along with the end cap 112 can form a plenum that can be in fluid communication with one or more of the heat exchangers 102.

Figure 3:
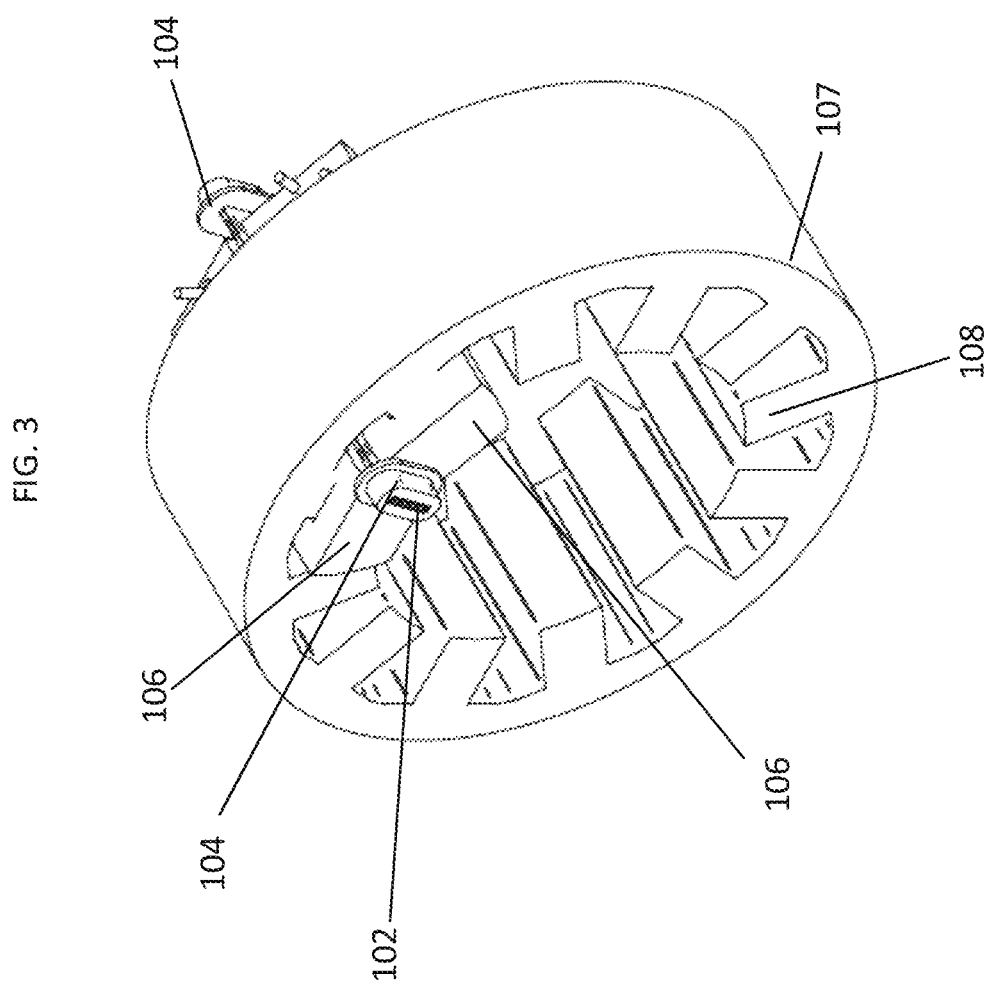
FIG. 3 is a perspective view of a portion of an electric machine illustrating another embodiment of the disclosure.
Figure 4:
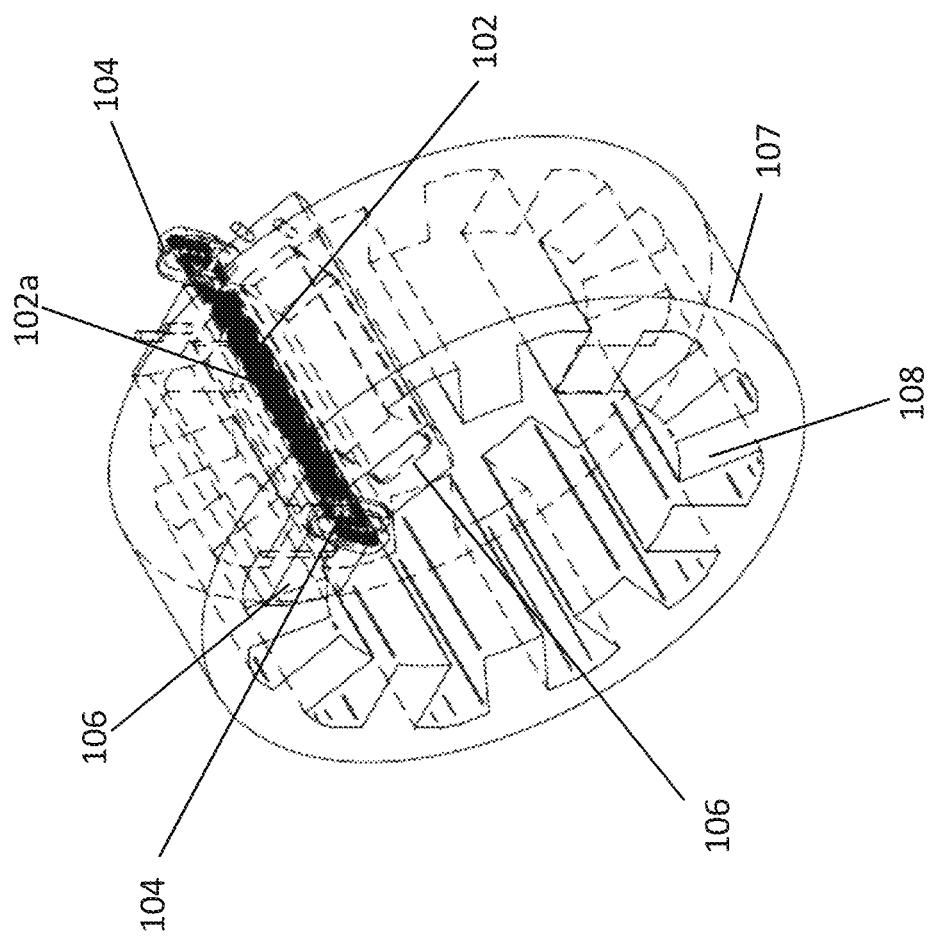
FIG. 4 is a perspective view of a portion of an electric machine illustrating another embodiment of the disclosure.

FIG. 3 shows another perspective view of electric machine 100 with elements removed to illustrate aspects of this disclosure. Specifically, FIG. 3 shows the stator 107, stator teeth 108, a heat exchanger 102 having micro features 102a, with non conducting bulkheads positioned on distal ends of the heat exchanger 102. Also shown are two coils 106 around two of the stator teeth. The heat exchanger 102 is positioned between the two coils. FIG. 4 shows the elements shown in FIG. 3, with a transparent view of the stator to further illustrate the positioning of the heat exchanger 102, micro features 102a, non-conducting bulkheads 104 and the two coils 106.

Figure 5:
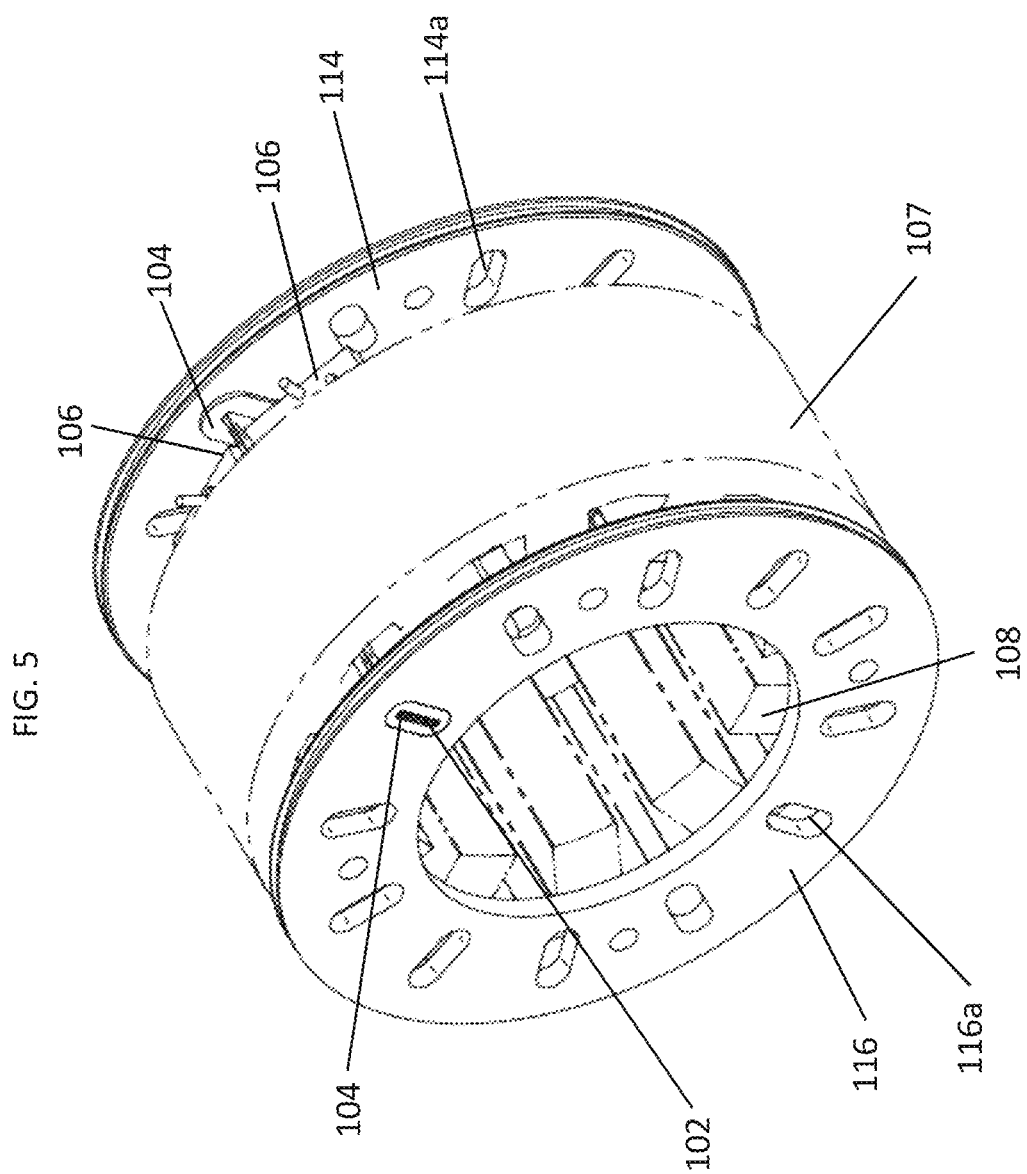
FIG. 5 is a perspective view of a portion of an electric machine illustrating another embodiment of the disclosure.
Figure 6:
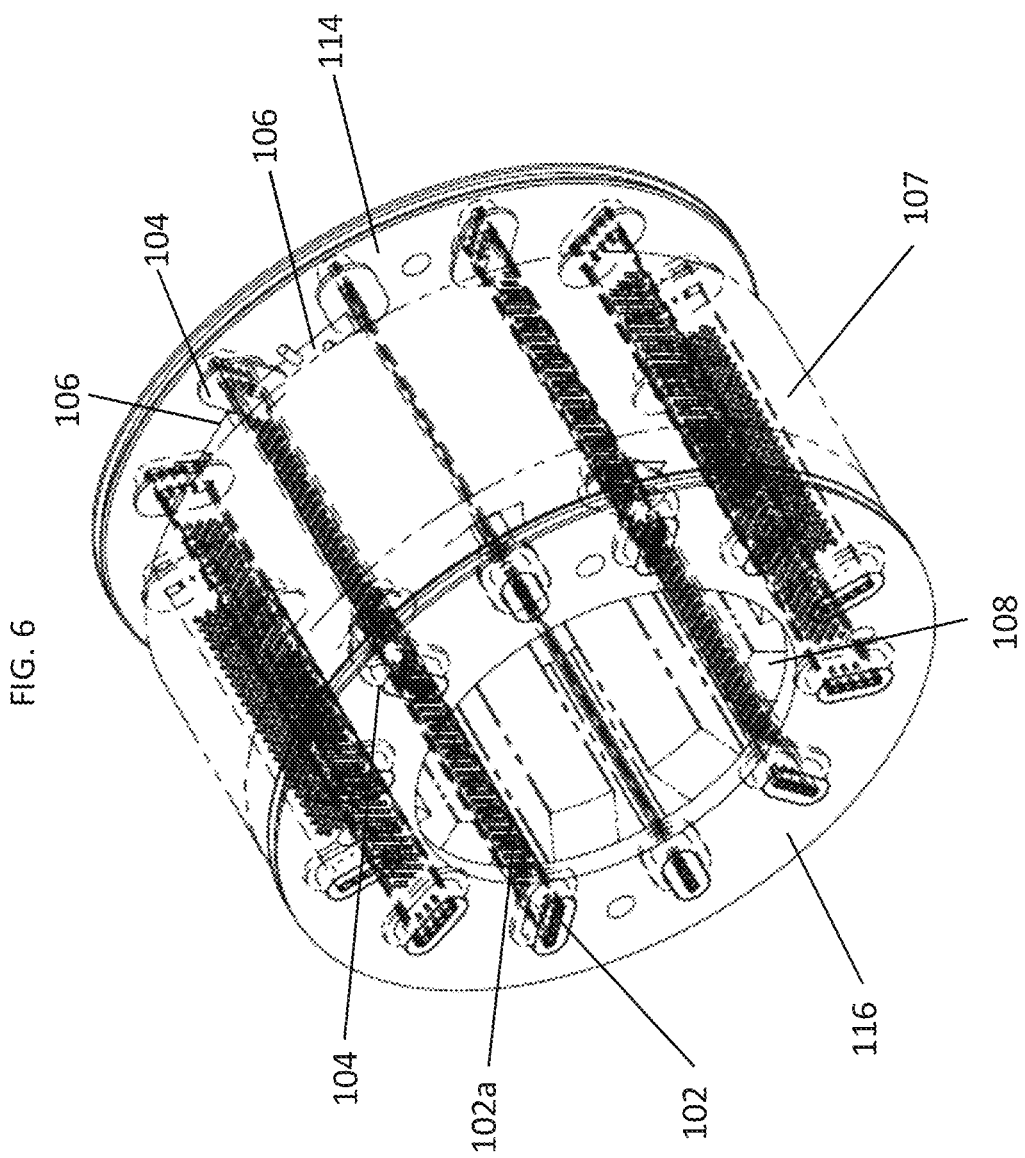
FIG. 6 is a perspective view of a portion of an electric machine illustrating another embodiment of the disclosure.

FIG. 5 also shows the elements shown in FIGS. 3 and 4, but also includes two plates 114 and 116. The plates 114 and 116 include a plurality of openings (one of which identified on plate 114 by reference 114a, and another identified on plate 116 by reference 116a). Non-conducting bulkhead 104 can be positioned in the openings 114a or 116a. In FIG. 5, the heat exchanger 102 is positioned between two coils 106, and at each distal end of the heat exchanger 102 is positioned a non-conducting bulkhead 104. The distal ends of the heat exchanger 102 are inserted in a corresponding non-conducting bulkhead 104. FIG. 6 shows the elements in FIG. 5, with the stator 107 shown transparently to further see how elements of the machine 100 are positioned. Whereas in FIG. 5, one heat exchanger 102 with two non-conducting bulkheads 104 were shown, FIG. 6 illustrates a heat exchanger 102 positioned between each of the stator teeth 108, with each heat exchanger 102 having a corresponding pair of non-conducting bulkheads 104 on each distal end of the heat exchanger 102. The non-conducting bulkheads are positioned on each of the openings 114a and 116a of the plates 114 and 116 respectively.

Figure 7:
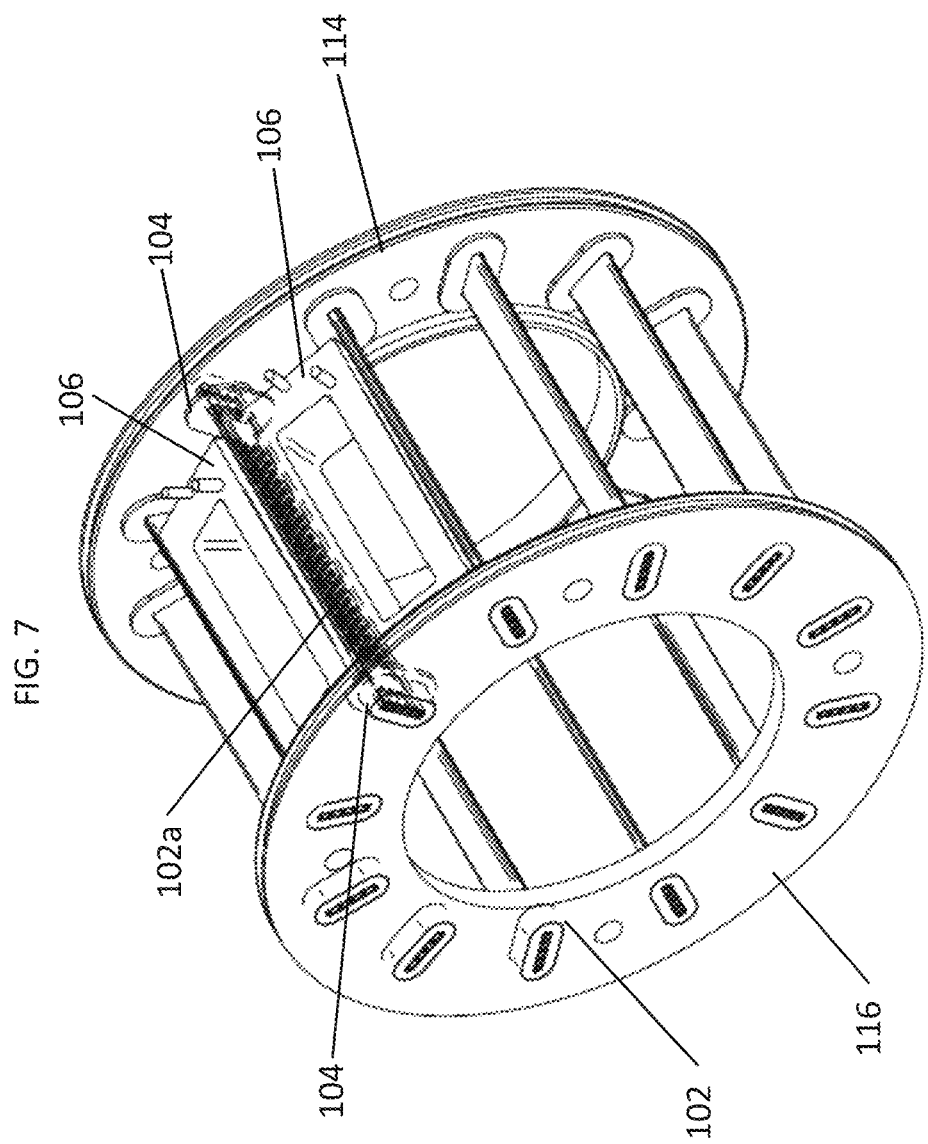
FIG. 7 is a perspective view of a portion of an electric machine illustrating another embodiment of the disclosure.
Figure 8:
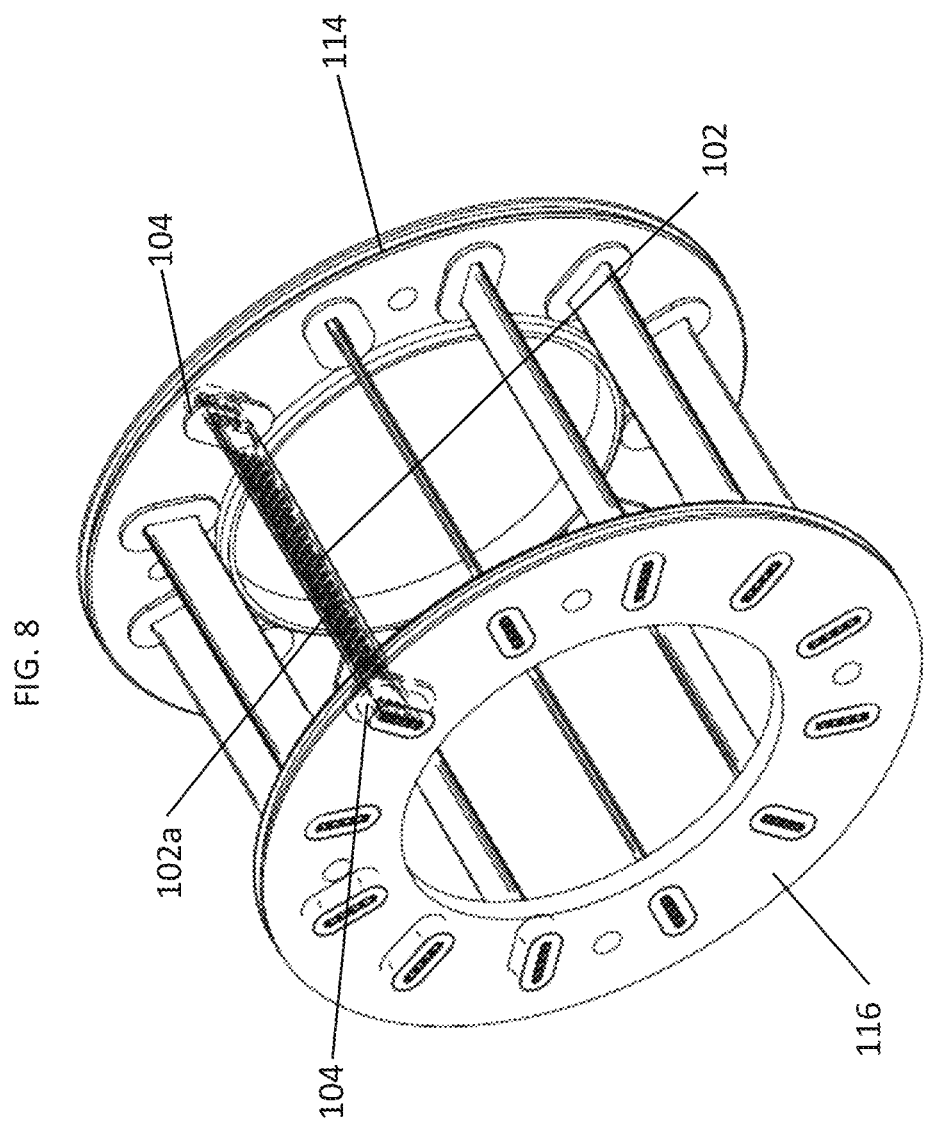
FIG. 8 is a perspective view of a portion of an electric machine illustrating another embodiment of the disclosure.

FIGS. 7 and 8 show another perspective view of machine 100 with elements removed to illustrate aspects of this disclosure. FIG. 7 is similar to FIG. 5 with the stator 107 removed. As can be seen in FIG. 7, the heat exchanger 102, the distal ends of which have a non-conducting bulkhead 104, which in turn is positioned in openings 114a and 116a of plates 114 and 116. FIG. 8 is similar to FIG. 7 except that the coils 106 have been removed to further illustrate the relationship between the plates 114 and 116, the heat exchangers 102 and the non-conducting bulkheads 104.

Figure 9:
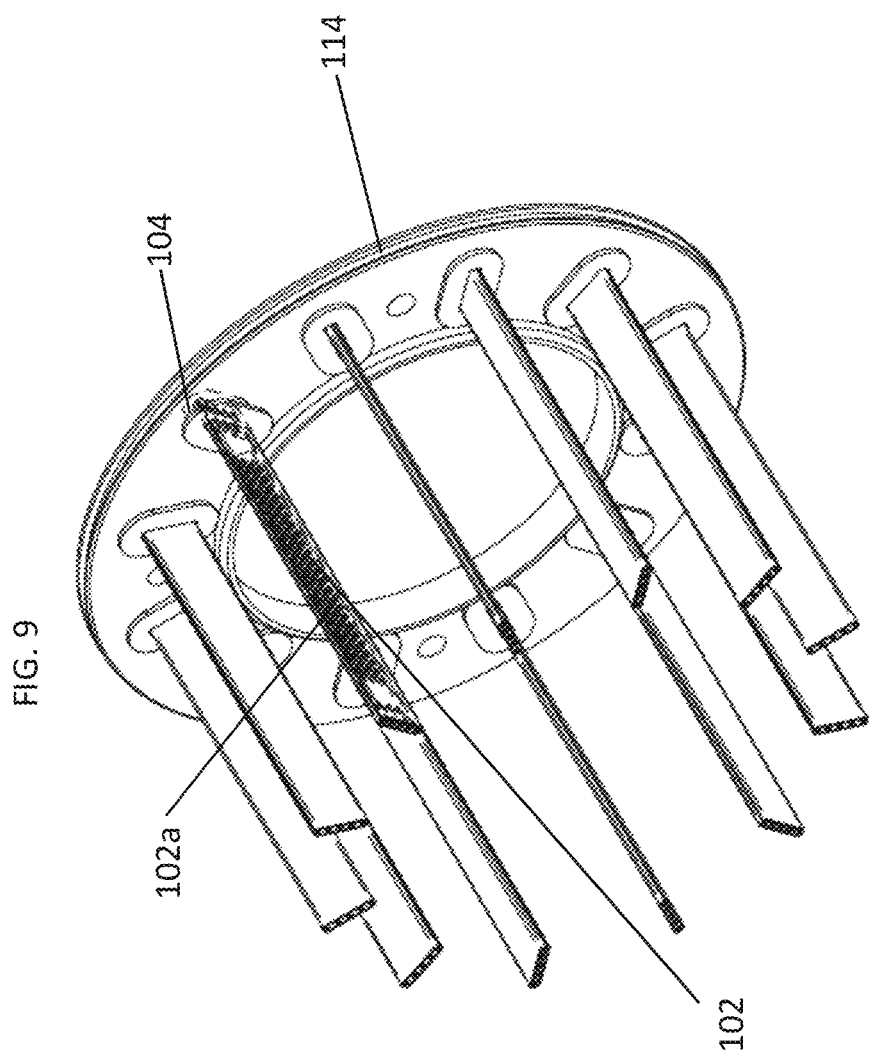
FIG. 9 is a perspective view of a portion of an electric machine illustrating another embodiment of the disclosure.

FIG. 9 illustrates another perspective view of machine 100 with elements removed to illustrate aspects of this disclosure. In FIG. 8, the non-conducting bulkheads 104 are positioned in openings 114a of the plate 114, and one end of the heat exchangers 102 are inserted into the non-conducting bulkhead 104. These elements form a kind of "carousel." In an embodiment, during manufacturing, the elements in FIG. 9 (i.e., the "carousel") can speed up the manufacturing process for machine 100. For example, in an embodiment, the plate 116 (not shown in FIG. 9) having openings 116a, in which a non-conducting bulkhead 104 is positioned, can be mounted on the stator 107 (also not shown in FIG. 9). This is similar to what is shown in FIG. 6. Then the machine 100 can be assembled by sliding the "carousel" shown in FIG. 9 in an axial direction toward plate 116, such that the heat exchangers 102 slide between the teeth 108 of the stator 107, until the distal ends of the heat exchanger 102 are inserted into the non-conducting bulkheads 104 that are positioned in the openings 116a of the plate 116.

Figure 10:
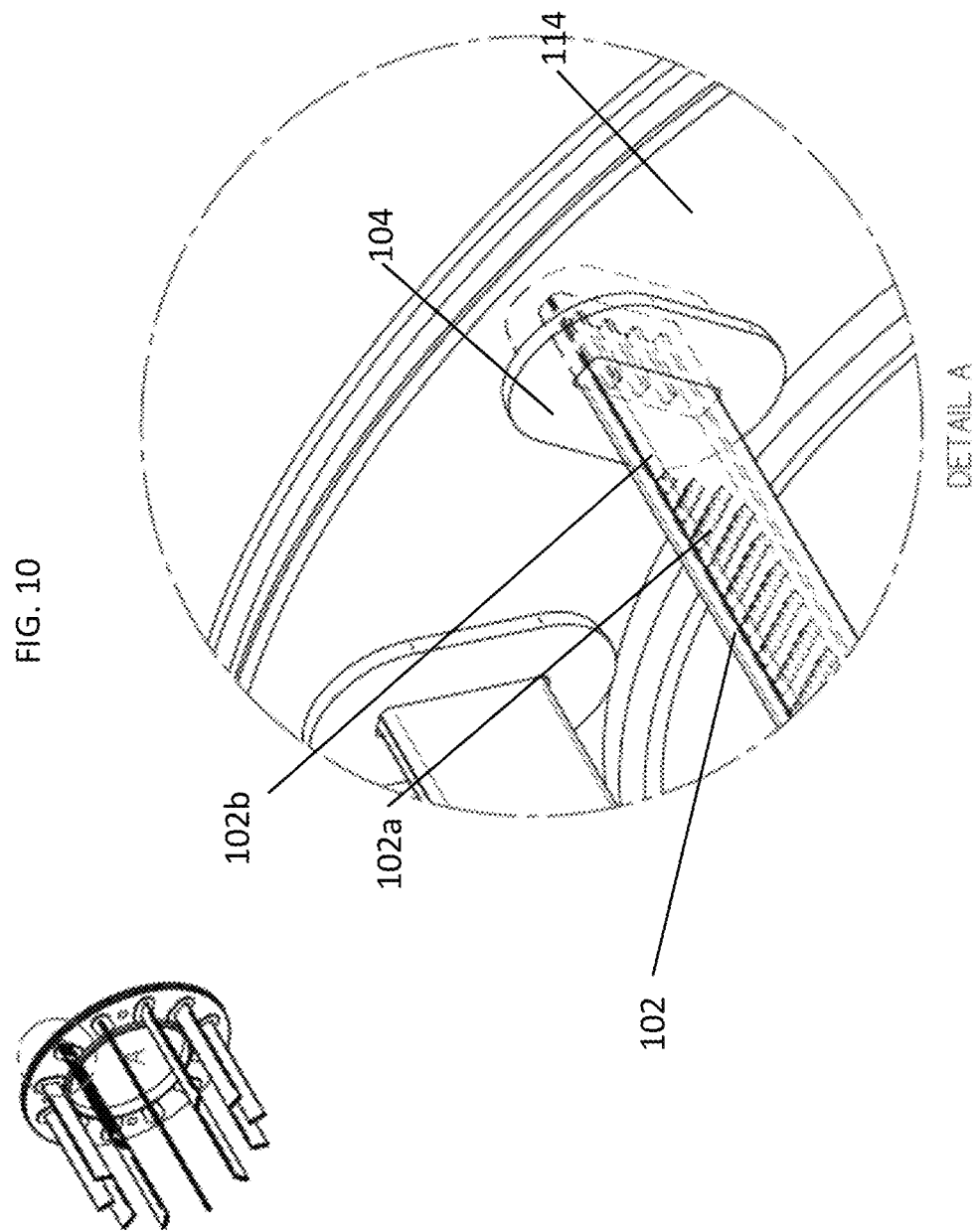
FIG. 10 is a perspective view of a portion of an electric machine illustrating another embodiment of the disclosure.

FIG. 10, illustrates a closer view of the "carousel." More specifically, FIG. 10 shows the insertion of a distal end of a heat exchanger into a non-conducting bulkhead 104 that is positioned in an opening 114a of the plate 114. Because the non-conducting bulkhead 104 is positioned in the opening 114a, the opening 114a is not visible.

Figure 11:
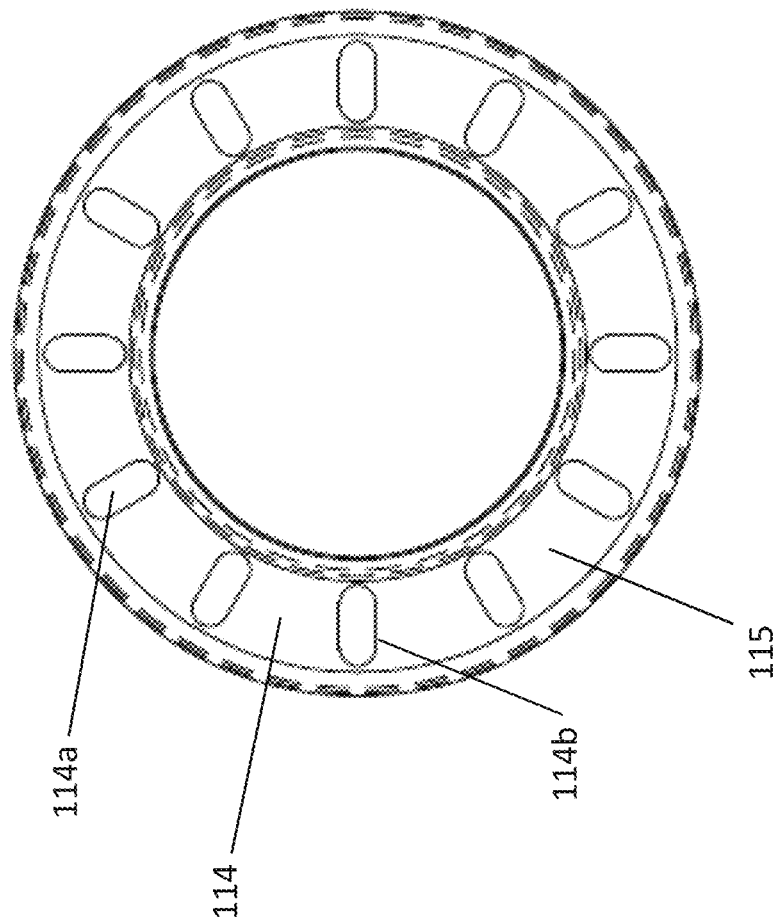
FIG. 11 is a planar view of a portion of an electric machine illustrating another embodiment of the disclosure.
Figure 12:
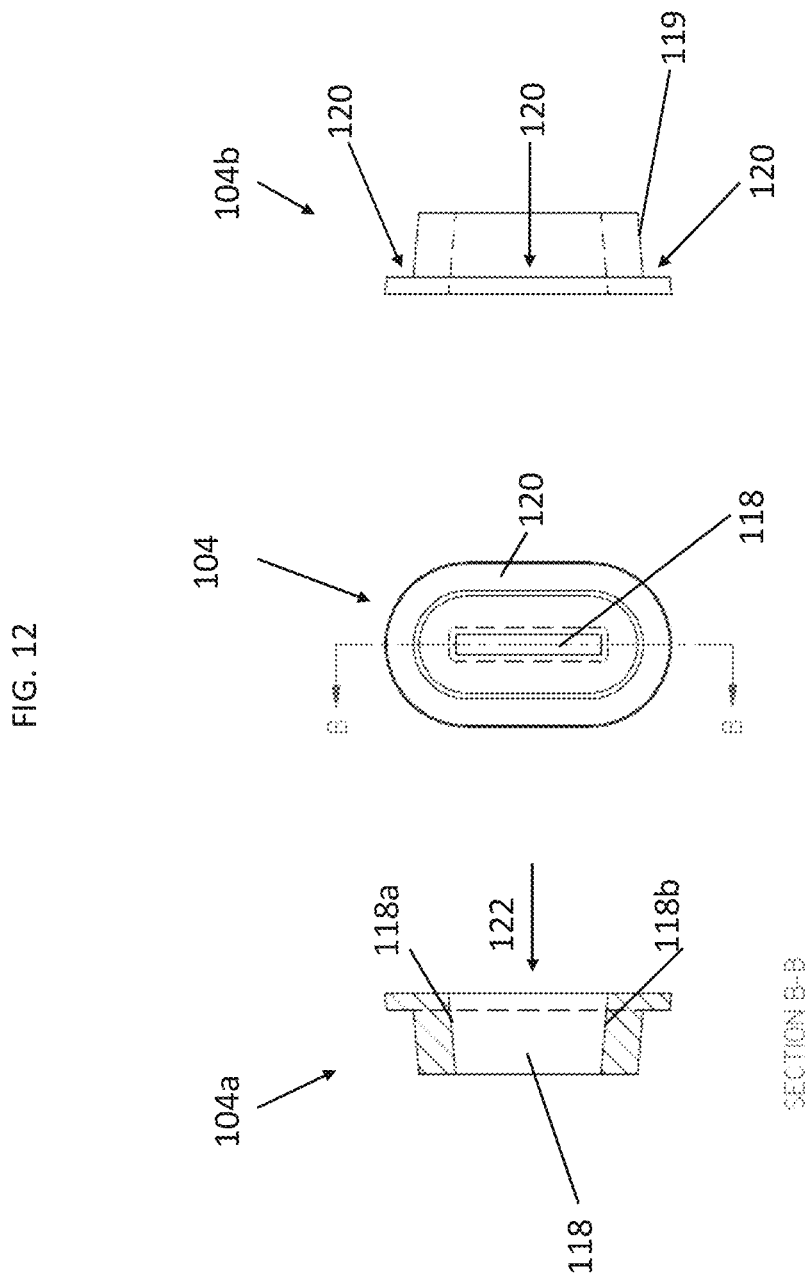
FIG. 12 is top view and cross section view of a portion of an electric machine illustrating another embodiment of this disclosure.

FIGS. 11 and 12 further illustrate the relationship between a non-conducting bulkhead 104 and openings 114a. FIG. 11 shows the plate 114, which includes an annular surface 115. In one embodiment the annular surface 115 can be a planar surface. In another embodiment, the annular surface 115 could be a helical surface. It is understood by persons of ordinary skill, that other surfaces can be employed, without departing from the scope of the disclosure.

The surface of the plate 115 can be used in combination with an end cap to serve as an inlet or outlet plenum (with plate 114). It should be understood that embodiments of the machine 100, including those described above, can include two plates (e.g., plates 114 and 116), one of which could would allow fluid to enter the machine 100 and flow in proximity to the heat exchangers to remove heat from the electric machine 100, and another which could serve as an outlet (e.g., an outlet plenum with an end cap) to remove the fluid that exits the machine 100 after flowing in proximity to the heat exchangers. It should be understood that multiple ways of flowing fluid in proximity of the heat exchangers can be employed without departing from the scope of this disclosure. For example, embodiments of the heat exchanger 102 can include an interior channel, wherein micro features are disposed, with fluid flowing in the interior channel past the micro features. In other embodiments, the heat exchangers may include an interior channel without micro features. Other ways of flowing fluid in proximity to the heat exchanger can be used without departing from the scope of this invention.

The plate 114 includes openings 114a, each of which, in the embodiment shown in FIG. 11, has an ovular shape with an edge 114b that interfaces with a non-conducting bulkhead. While the shape of the openings 114a are ovular, other shapes may be employed without departing from the scope of this disclosure. FIG. 12 illustrates the shape of a non-conducting bulkhead 104 that interfaces with the openings 114a shown in FIG. 11.

More specifically, FIG. 12 illustrates a top view of and two cross section views at line B-B of the non-conducting bulkhead 104. Reference 104a illustrates an interior cross section view of the non-conducting bulkhead 104 from an interior perspective, and reference 104b illustrates an exterior cross view of the non-conducting bulkhead 104. Referring to the internal view 104a, the non-conducting bulkhead includes a channel 118 that receives a distal end of a heat exchanger, such as heat exchanger 102 described in embodiments above. The channel 118 includes a sealing surface side 118a and another sealing surface side 118b, each of which can have one or more facets. For example, in FIG. 12, the surface sides 118a and 118b have facets that form a tapered end of the channel 118, which permits easier insertion of the heat exchanger 102, indicated by the arrow 122. When a heat exchanger 102 is inserted into the channel 118 of the non-conducting bulkhead 104, the surface sides 118a and 118b will press against the heat exchanger 102, and will form a seal. As a result, the channel 118 will provide electrical and fluid isolation for the heat exchanger 102.

In the embodiment shown in FIG. 12, the exterior of the non-conducting bulkhead 104 includes an exterior surface 119. When a heat exchanger 102 is inserted into the non-conducting bulkhead 104, the exterior surface 119 will press against the edge 114b of the opening 114a of the plate 114 and will form a seal. As a result, the exterior surface 119 provides electric and fluid isolation for the plate 114. Furthermore, the non-conducting bulkhead 104 can also include a surface 120 of the bulkhead 104, that can overlap the surface 115 of the plate 114. The overlapping surface is one way in which the bulkhead can be positioned in the opening 114a and remain secured along the edge 114b of the openings 114. In addition, in certain electric machine manufacturing processes where voids in the machine are filled with pressurized polymer, the overlapping surface 120 can protect the seal created by the exterior surface 119 described above. More specifically, the overlapping surface 120 can prevent the pressurized polymer from contacting the exterior surface 119, which if contact could reduce the effect of the seal created by exterior surface 119. It should be understood by persons having ordinary skill in the art that the shape and dimensions of non-conducting bulkhead 104 is intended to be an example and non-limiting. Other shapes and dimensions can be used without departing from the scope of this disclosure, as recognized by persons having ordinary skill in the art. For example, and non-limiting, the non-conducting bulkhead could have a triangular, rhomboidal or concave hexagonal "bow-tie" shapes.

Having the non-conducting bulkhead 104 positioned in the openings 114a of the plate 114 provides several advantages. For example, the plate 114 can be made of aluminum, which improves thermal conductivity, which in turn enhances the performance of the electric machine 100. The plate 114 could be made of other materials, such as steels, stainless steels, high-strength alloys, titanium alloys, copper alloys and thermally conductive polymers. Another advantage is in manufacturing. The bulkheads can be made of a polymer and can be manufactured using, for example, an injection molding process. As a result, the bulkheads can be manufactured and then positioned in the openings of the plate. Other processes, such as creating an annulus made of polymer (rather than the combination of a plate with openings, with a bulkhead positioned in each opening) to serve as the bulkhead can increase costs and manufacturing time. Moreover, such a process also may not be as thermally conductive as the combination of the plate and non-conducting bulkheads.

As described above, the heat exchangers can be positioned in between coils, which are typically wound around teeth of the stator. To provide an electric machine with more reliability, and to improve its manufacturability both in speed, quality, and reduced cost of manufacture, the windings of the electric machine described herein can be consolidated coils, which are positioned on the stator teeth. The consolidated coils comprise coil windings of a conductive material such as copper, aluminum, or another suitable conductor. The coils can be wound around an insulator, either a slot liner or bobbin or other suitable insulator, and an epoxy or other suitable insulator can be used to provide the consolidation of the windings, thereby constituting a "consolidated coil." In this embodiment, the insulator, coil and epoxy composite is a rigid and monolithic body. This body, as described in more detail below, can be formed into a particular shape, which shape can include one or more facets.

Figure 13:
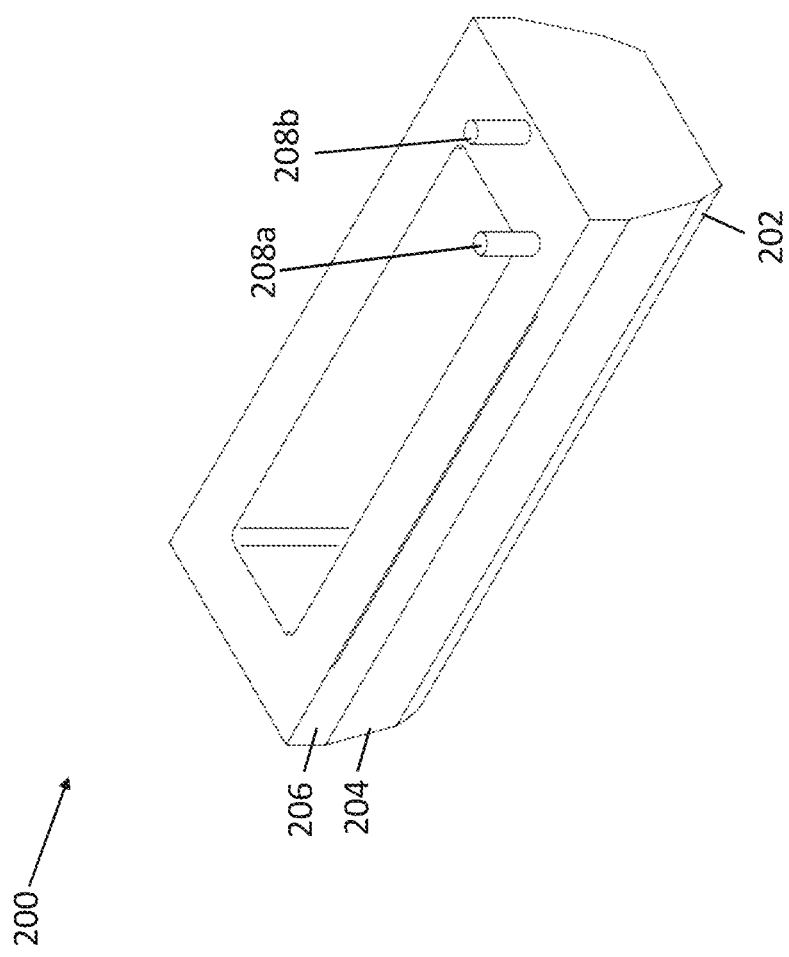
FIG. 13 is a perspective view of a portion of an electric machine illustrating another embodiment of the disclosure.

FIG. 13 is a perspective view of a consolidated coil 200 in accordance with an embodiment of the present disclosure. The consolidated coil 200 includes a first, second, and third facets identified by reference 202, 204, and 206 respectively. The consolidated coil 200 also includes ends of the coil 208a and 208b. The facets 202, 204, and 206 can correspond to the geometry of the stator. More specifically, the angles of the facets can be selected such that the consolidated coil 200 can fit on a stator tooth while also provides clearance for a heat exchanger and another consolidated coil on an adjacent stator tooth. While the embodiment in FIG. 13 shows three facets, it should be understood that consolidated coils with fewer than three facets or greater than three facets can be used without departing from the scope of this disclosure. The facets described herein allow for the control of the geometry of the coil to, for example, maximize the number of windings per coil given the amount of available space in the stator slots. They also allow for easy installation of the heat exchangers described herein, which are positioned in between the coils. Moreover, as recognized by persons having ordinary skill, when coils are formed simply by winding wire around a stator tooth, the position of the wires forming the coil are not fixed. And not only can the wires move, under a given force, the wires in adjacent coils may not collectively be shaped the same, resulting in irregular spacing in between them. Positioning a heat exchanger in between such coils can therefore be difficult and time consuming. Providing consolidated coils and controlling their geometries results in coils where the location of the wires do not move, and coils are shaped the same way, thus providing the same space in between them. Moreover, instead of having to wind coils about a stator tooth, use of consolidated coils allows pre-fabrication of the coils that can then be "dropped" onto each stator tooth.

Figure 14:
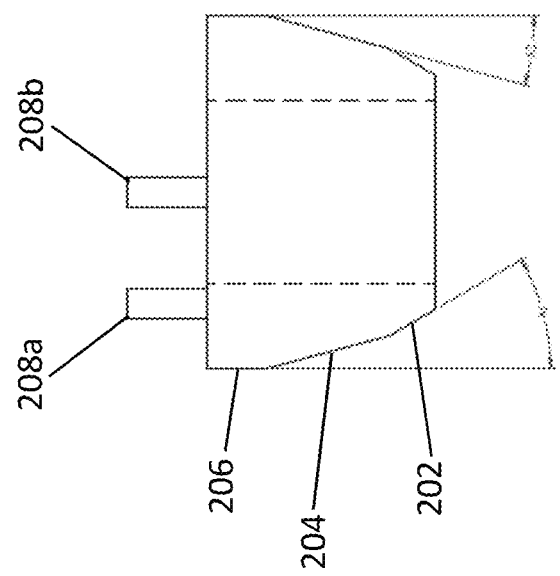
FIG. 14 is a planar view of a portion of an electric machine illustrating another embodiment of the disclosure.

As stated above, the consolidated coil can be designed to take into account the geometry of the stator. For example, the gap between adjacent stator teeth (i.e., stator slot), the length of the stator teeth, and the number of stator teeth can affect the angles of the one or more facets of the consolidated coil. FIG. 14 shows a planar view of a distal end of the consolidated coil 200 to illustrate the geometries of the facets 202, 204 and 206. The geometries on each side of the consolidated coil in this embodiment is the same. As shown in FIG. 14, first facet 202 is at an angle A1, and the second facet is at A2. The angle A1 can be 30 degrees and A2 can be 15 degrees. The 15-degree angle can also be considered the bisector of the stator slot. These angles A1 and A2 take into account attributes of the electric machines including the number of stator teeth. So for example, if there are 12 stator teeth, angle A1 will be 30 degrees (360 degrees divided by 12). The 30 degrees provides clearance not just for another consolidated coil but also for a heat exchanger that is placed between the two consolidated coils.

In a typical electric machine, where there is no heat exchanger positioned between the windings of a stator, there is more room for coil to be wound around the teeth of a stator. Because embodiments described herein have heat exchangers positioned in between the stator teeth, there is less space for the windings. Having consolidated coils allows the ability to maximize the space available for the coils because the overmolding of the coils with epoxy allows for the control of the shape of the coils. So for example, in FIGS. 13 and 14, the coil 200 has defined facets that maximize the number of coils, while also providing clearance for the heat exchanger and adjacent coils.

Figure 15:
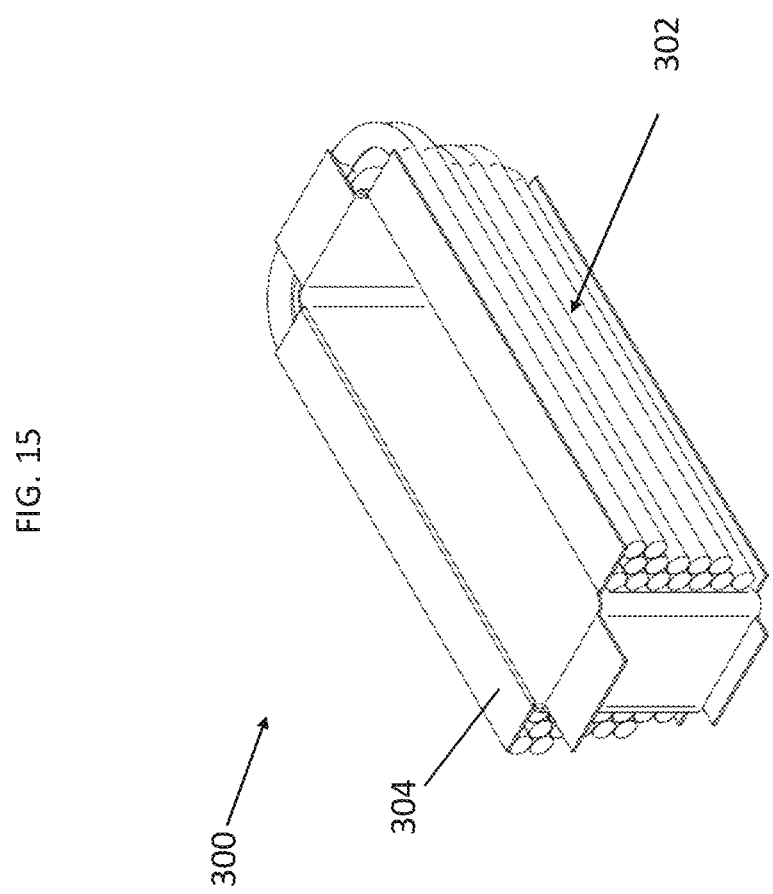
FIG. 15 is a perspective view of a portion of an electric machine illustrating another embodiment of the disclosure.
Figure 16:
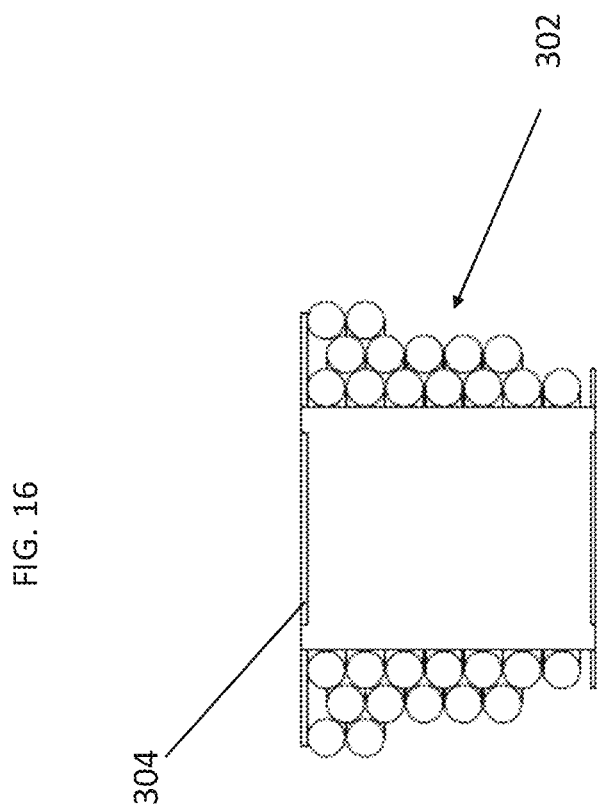
FIG. 16 is a planar and cross sectional view of a portion of an electric machine illustrating another embodiment of the disclosure.

FIG. 15 shows a perspective view of a coil 300 before it has been overmolded with epoxy according to an aspect of this disclosure. The coil 300 has a plurality of turns of conductors 302, or windings, that are wound around a slot liner 304. A cross section of these windings are further illustrated in FIG. 16. When the coil 300 is placed in a mold, epoxy can be applied to the windings 302 to form the consolidated coil with the proper facets to maximize the available space between the stator teeth. The mold can also be designed such that a heat exchanger can be formed integrally on one or more facets of the consolidated coil. For example, the mold can be designed such that one or more of the facets can be formed with micro features, and instead of a discrete heat exchanger, the facets with micro features can act as a heat exchanger, with heat from the windings dissipated by fluid flowing across the micro features. A person having ordinary skill in the art will understand that instead of a slot liner, a bobbin or any other suitable insulator can be used without departing from the scope of this disclosure.

It should also be understood that consolidated coils can be used for rotor windings. In such an embodiment, the geometries of the facets would be different, but nonetheless would have to take into account the rotor teeth and the space between the teeth. It will be appreciated by persons of ordinary skill in the art that the coil winding being consolidated saves manufacturing time and improves consistency, over winding methods wherein the turns of conductors are wound directly around the stator tooth.

Figure 17:
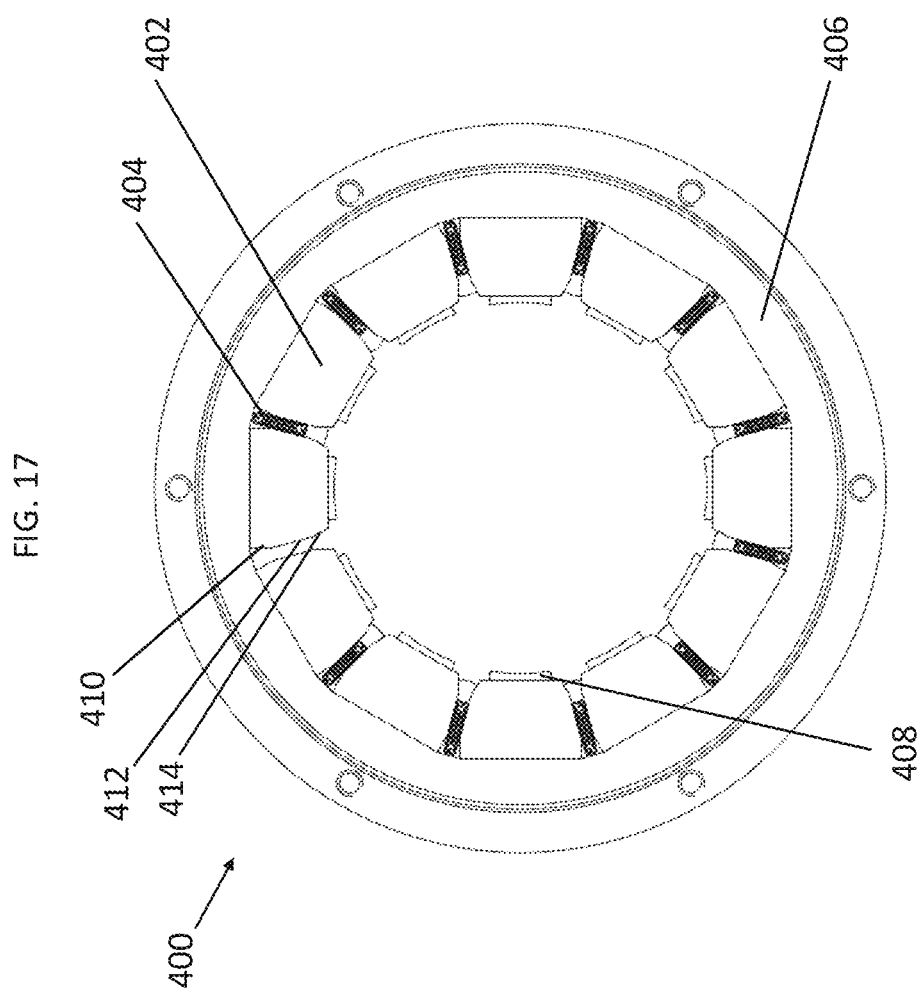
FIG. 17 is a planar view of a portion of an electric machine illustrating another embodiment of the disclosure.

FIG. 17 illustrates portions of an electric machine 400 having consolidated coils (one of which is identified by reference 402), positioned on the teeth (one of which is identified by reference 408) of a stator 406. Positioned between the consolidated coils 400 are a plurality of heat exchangers, one of which is identified by reference 404. The consolidated coil 402 has first, second and third facets, shown by reference 410, 412 and 414. As shown in FIG. 17, the consolidated coil 402 and its corresponding facets 410, 412, 414, allow for the maximization of coils in the space between the stator teeth, which space also needs to accommodate the heat exchanger 402.

While embodiments have been illustrated and described herein, it is appreciated that various substitutions and changes in the described embodiments may be made by those skilled in the art without departing from the spirit of this disclosure. The embodiments described herein are for illustration and not intended to limit the scope of this disclosure.

The invention claimed is:

1. A non-conductive bulkhead for use in an electric machine using direct winding heat exchange, the non-conductive bulkhead comprising:
   a body made of polymer, the body including a first sealing surface and a tapered channel, the channel including a second sealing surface;
   wherein the first sealing surface is configured to provide electric and fluid isolation for a plate of an electric machine; and
   wherein the second sealing surface of the channel is configured to receive and provide electric and fluid isolation for a direct winding heat exchanger.

2. The non-conductive bulkhead of claim 1, further comprising an overlapping surface, the overlapping surface extending from the channel wherein the first surface is configured to overlap with a surface of the plate of the electric machine.

3. An electric machine having direct winding heat exchange including the non-conducting bulkhead of claim 1.

4. A method of manufacturing an electric machine having direct winding heat exchange comprising:
   providing a plate with a plurality of openings:
   providing an end cap and positioning the end cap adjacent to the plate to form a plenum; and
   inserting the non-conducting bulkhead of claim 1 into at least one of the plurality of openings.

* * * * *